(12) United States Patent
Chang et al.

(10) Patent No.: US 12,536,159 B1
(45) Date of Patent: Jan. 27, 2026

(54) POSITIONAL QUICK INSERT

(71) Applicant: Progress Software Corporation, Burlington, MA (US)

(72) Inventors: Hui Yeng Chang, Allenstown, NH (US); Neil Kenny, Galway Connacht (IE); James Cashman, Byfield, MA (US); David LeBlanc, Madison, WI (US); John F. Picinich, Brookline, NH (US); Robert Kudrle, Madison, WI (US)

(73) Assignee: Progress Software Corporation, Burlington, MA (US)

( * ) Notice: Subject to any disclaimer, the term of this patent is extended or adjusted under 35 U.S.C. 154(b) by 182 days.

(21) Appl. No.: 18/315,296

(22) Filed: May 10, 2023

Related U.S. Application Data

(60) Provisional application No. 63/340,718, filed on May 11, 2022.

(51) Int. Cl.
*G06F 3/0482* (2013.01)
*G06F 16/23* (2019.01)
*G06F 16/242* (2019.01)
*G06F 16/28* (2019.01)

(52) U.S. Cl.
CPC ........ *G06F 16/2379* (2019.01); *G06F 3/0482* (2013.01); *G06F 16/2428* (2019.01); *G06F 16/282* (2019.01)

(58) Field of Classification Search
CPC .... G06F 16/2246; G06F 40/14; G06F 40/137; G06F 40/154; G06F 16/322
See application file for complete search history.

(56) References Cited

U.S. PATENT DOCUMENTS

| | | | |
|---|---|---|---|
| 2015/0066711 A1* | 3/2015 | Chua | G06Q 30/00 705/28 |
| 2019/0377801 A1* | 12/2019 | McKee | G06F 16/86 |
| 2022/0058222 A1* | 2/2022 | Cheng | G06F 16/9027 |

* cited by examiner

*Primary Examiner* — Phuong H Nguyen
(74) *Attorney, Agent, or Firm* — Patent Law Works LLP

(57) ABSTRACT

The disclosure includes a system and method for obtaining a hierarchical structure including a plurality of components; determining a set of available insertion positions within the hierarchical structure, the set of available positions including a first position, where in an available insertion position is a position within the hierarchical structure that, responsive to a user request, a new component may be inserted into the hierarchical structure; determining a set of inserts available at the first position within the hierarchical structure; presenting a user interface, the user interface representing: the hierarchical structure of the plurality of components; a set of insert elements; receiving a request to insert the new component into the hierarchical structure at the insert position associated with the first insert element; and modifying the hierarchical structure by inserting the new component into the hierarchical structure at the insert position associated with the first insert element.

20 Claims, 8 Drawing Sheets

PRIOR ART

POSITIONAL QUICK INSERT

FIELD OF INVENTION

The present disclosure relates to a positional insert in a user interface displaying a hierarchical structure.

BACKGROUND

Existing approaches include drag-and-drop from tools palette, supporting right-click context menus or using the "three-dots" at the end of a row of data. However, such approaches are slow for users to achieve the goal of adding new items to the tree or were harder for users to discover. Moreover, the existing approaches are not accessible to users with disabilities.

SUMMARY

In general, an innovative aspect of the subject matter described in this disclosure may be embodied in methods and systems for obtaining, using one or more processors, a hierarchical structure including a plurality of components; determining, using the one or more processors, a set of available insertion positions within the hierarchical structure, the set of available positions including a first position, where in an available insertion position is a position within the hierarchical structure that, responsive to a user request, a new component may be inserted into the hierarchical structure; determining, using the one or more processors, a set of inserts available at the first position within the hierarchical structure; presenting, using the one or more processors, to a user, a user interface, the user interface representing: the hierarchical structure of the plurality of components; a set of insert elements, where each insert element within the set of insert elements is associated with one of the available insertion positions from the determined set of available insertion elements, the set of insert elements including a first insert element associated with the first position within the hierarchical structure; receiving, using the one or more processors, in association with the first insert element, a request to insert the new component into the hierarchical structure at the insert position associated with the first insert element; and modifying, using the one or more processors, the hierarchical structure by inserting the new component into the hierarchical structure at the insert position associated with the first insert element.

Other implementations of one or more of these aspects include corresponding systems, apparatus, and computer programs, configured to perform the actions of the methods, encoded on computer storage devices.

These and other implementations may each optionally include one or more of the following features. For example, determining the set of available insert positions is based on one or more of a set of rules and machine learning. For example, determining a first set of inserts available at the first position within the hierarchical structure based on the context of the first position. For example, determining the first set of inserts available at the first position within the hierarchical structure based on the context of the first position is based on one or more of a set of rules and machine learning. For example, determining an indication of interest associated with the first insert element; and presenting, to the user, the first set of inserts available at the first position within the hierarchical structure responsive to the indication of interest. For example, the hierarchical structure is associated with a script being generated in a low-code environment, and where the set of inserts available are associated with low-code components that may be inserted into the script at the first position. For example, the first set of inserts available at the first position within the hierarchical structure is presented contemporaneously with the first insert element and at least a portion of the hierarchical structure, and where presentation of the first insert element is modified to indicate that the first insert element has been determined to be of interest. For example, the first insert element is determined to be of interest responsive to one of a pointer hover over the first insert element, a click on the insert element using a pointer, and navigation to the first insert element using a keyboard. For example, the user interface is a graphical user interface and the first position is represented visually to the user on a display in a first dimension associated with the first insert element and a second dimension associated with the first insert element, where the first dimension visually represents a sequential order of a component inserted at the first position relative to a peer level component in the hierarchical structure, and where the first dimension visually represents a level within the hierarchical structure of a component inserted at the first position. For example, the hierarchical structure is a tree.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
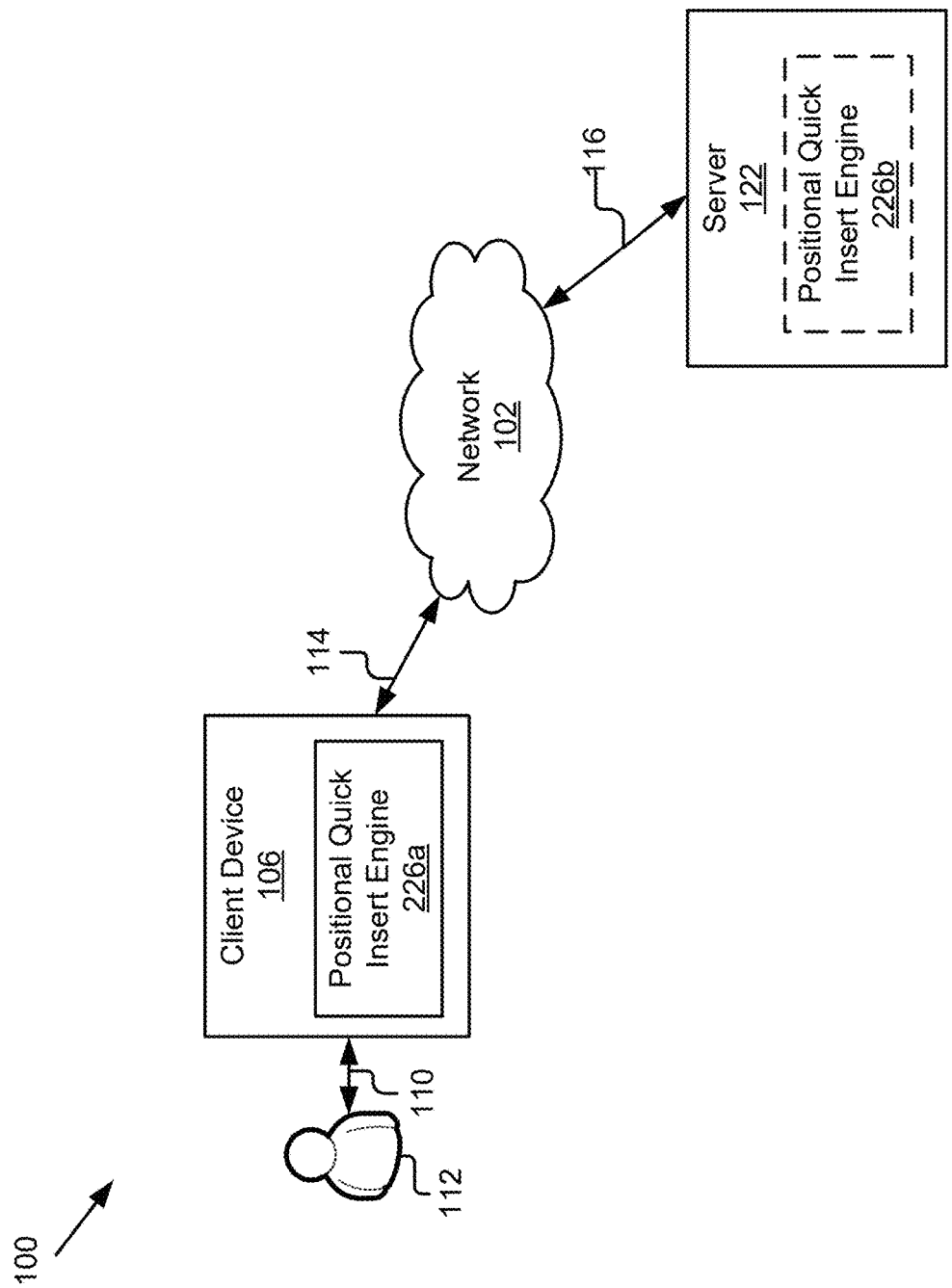
FIG. 1 is a block diagram illustrating an example system for positional quick insert according to some implementations.

For clarity and convenience, the description herein makes reference to an example in which a user is generating a low-code script that has an underlying tree structure (i.e., a hierarchical structure) to the script. However, it should be understood that the features and functionalities herein may be applied in different contexts (e.g., manipulating a document object model) and/or to different data (e.g., other non-linear data and/or hierarchical structures). Existing systems for interacting with a hierarchical structure in a graphical user interface are difficult to use.

For example, assume a user wants to place new items (e.g., new script) into the hierarchical structure of his/her script at a specific location. A drag-and-drop from a palette is not keyboard accessible, thereby limiting the accessibility of that feature and necessitating a transition of the user's hand from the keyboard to pointing device. Additionally, the user's eyes and pointing device must move from the hierarchical structure of the script to the palette, thereby increasing user time and exertion requirements, as the user needs to be careful not to lose the desired insertion position or needs to re-discover that insertion position.

As another example, a graphical diagram or flowchart is difficult to navigate and use with a keyboard or without a pointing device. Additionally, available insertion points may not be evident, and the visual space in a display is used inefficiently. Furthermore, the script the user is generating cannot be read from the icons and partial text comprising the graphical diagram/flowchart.

As another example, existing simple tree representations may have limited insertion points. For example, a simple trees may be limited to an insert-then-move strategy (e.g., with a single, initial insertion point) and/or options may be hidden in right-click menus, assuming a right click is supported (e.g. as it is on Windows but is not on Mac). Additionally, such menus require many clicks to achieve a desired insertion.

The positional quick insert system, methods, and UI described herein may address at least some of the foregoing issues. For example, in some implementations, the positional quick insert system, methods, and UI described herein allow a user to more easily and intuitively add new items to a hierarchical structure (e.g., a tree) where the user wishes, without using hidden menus (for example right-click context menus). In some implementations, the positional quick insert described herein makes it easier to insert new items at specific locations and allows a user to learn how to edit the hierarchical structure (e.g., a tree) more quickly. In some implementations, by using the positional quick insert, low-code scripting, or generation of other hierarchical structures, easier to learn, and faster to use.

Additionally, in some implementations, the positional quick insert system, methods, and UI provides input flexibility. For example, in some implementations, the positional quick insert system, methods, and UI described herein may be used independent of, or with various, input devices a user device has (e.g., mouse, keyboard, mouse with right-click) and a user selects to use. Therefore, users that prefer to traverse the hierarchical structure via a keyboard without removing a hand to manipulate a mouse or other pointing device may do so, and a user that prefers to use a pointer may also do so.

Additionally, in some implementations, the positional quick insert system, methods, and UI provides enhanced accessibility over alternatives. For example, in some implementations, the positional quick insert system, methods, and UI meets Web Content Accessibility Guidelines principles of accessibility, which are not met by alternatives. For example, some of the aforementioned are incompatible with screen readers, etc.

FIG. 1 is a block diagram illustrating an example system 100 for positional quick insert according to some implementations. The illustrated system 100 includes client device 106 and a server 122, which are communicatively coupled via a network 102 for interaction with one another. For example, the client device 106 may be coupled to the network 102 via signal lines 114 and may be accessed by a user 112 as illustrated by line 110. The server 122 may be coupled to the network 102 via signal line 116.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Comma Separated Values (CSV), etc. In addition, all or some of links can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client devices 106 are computing devices having data processing and communication capabilities. While FIG. 1 illustrates one client device 106, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The client device 106 may couple to and communicate with other entities of the system 100, such as the server 122 or another client device (not shown), via the network 102 using a wireless and/or wired connection.

Examples of the client device 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While one client device 106 is depicted in FIG. 1, the system 100 may include any number of client devices 106. In addition, when the system 100 includes multiple client devices, the client devices 106 may be the same or different types of computing devices.

In the depicted implementation, the client device 106 contains an instance 226a of a positional quick insert engine 226a. In some implementations, the server 122 may optionally, or alternatively, include an instance 226b of a positional quick insert engine 226b. Depending on the implementation, the features and functionality of the positional quick insert engine 226 may be entirely client-side (e.g., at 226a), entirely server side (e.g., at 226b), or divided between the client 106 and server 122 (e.g., across 226a and 226b). In some implementations, the positional quick insert engine 226a/b instances are not necessarily identical instances.

The positional quick insert engine 226 may be stored in a memory and executed by a processor of a client device 106 and/or of a server 122. For example, the client device 106 includes a positional quick insert engine 226a and the client device 106 executes instructions of the positional quick insert engine 226a.

The server 122 may include one or more computing devices having data processing, storing, and communication capabilities. For example, the server 122 may include one or more hardware servers, server arrays, storage devices, systems, etc., and/or may be centralized or distributed/cloud-based. In some implementations, the server 122 may include one or more virtual servers, which operate in a host server environment and access the physical hardware of the host server including, for example, a processor, memory, storage, network interfaces, etc., via an abstraction layer (e.g., a virtual machine manager). In one embodiment, the server 122 includes an instance of the positional quick insert engine 226b.

It should be understood that the system 100 illustrated in FIG. 1 is representative of an example system for positional quick insert according to one implementation and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices or systems, etc.

Figure 2:
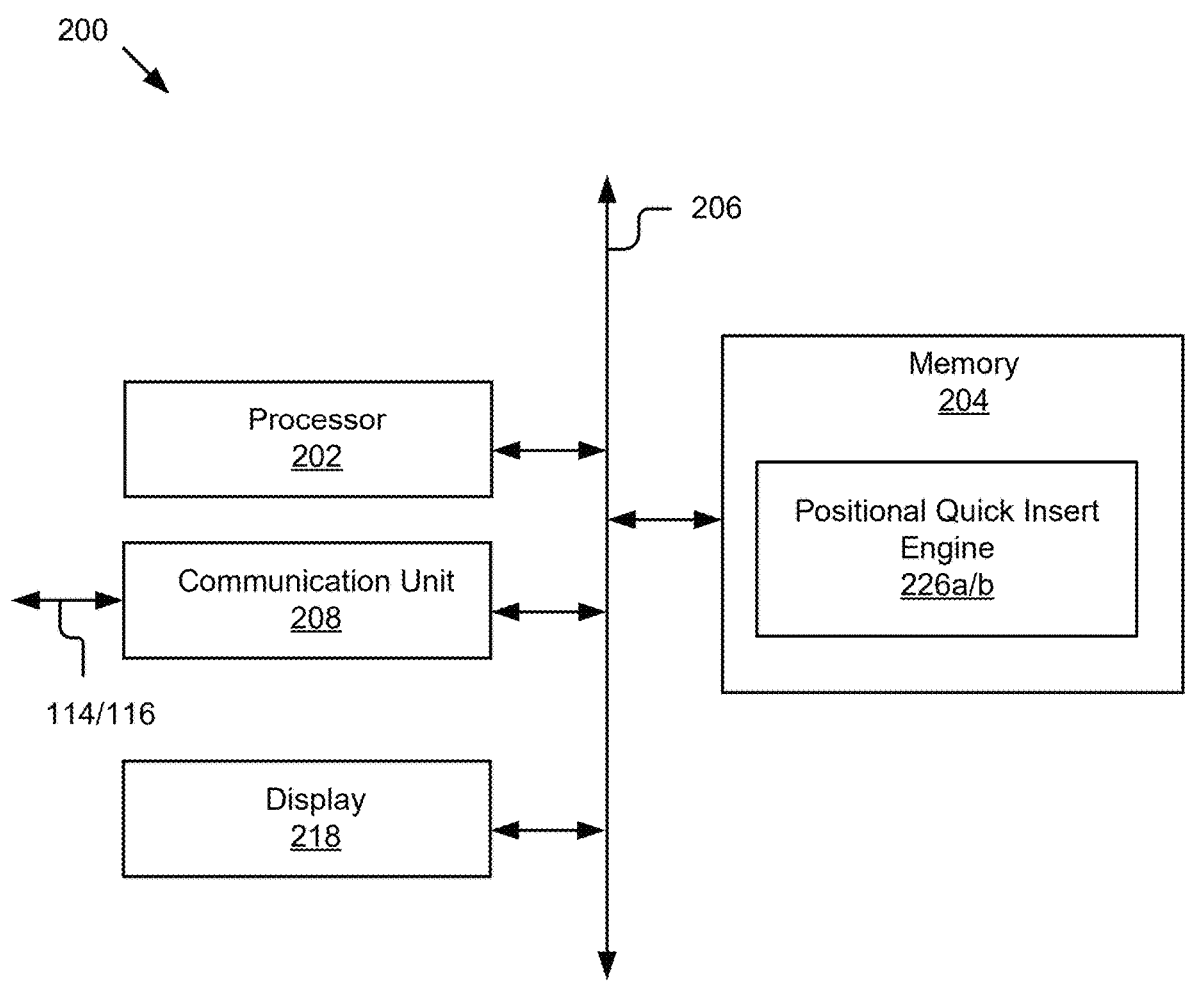
FIG. 2 is a block diagram illustrating an example computing device according to some implementations.

FIG. 2 is a block diagram of an example computing device 200 according to some implementations. The computing device 200, as illustrated, may include a processor 202, a memory 204, display 218, and a communication unit 208, which may be communicatively coupled by a communications bus 206. The computing device 200 depicted in FIG. 2 is provided by way of example and it should be understood that the computing device 200 may take other forms and include additional or fewer components without departing from the scope of the present disclosure. For example, while not shown, the computing device 200 may include a storage device, input and output devices (e.g., a keyboard, a mouse, touch screen, speakers, etc.), various operating systems, sensors, additional processors, and other physical configurations.

The processor 202 may execute code, routines, and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and the processor 202 may have a single core or a plurality of processing units and/or cores. In some implementations, the processor 202 may be capable of generating and providing electronic display signals to a display device (not shown), supporting the display of images, capturing and transmitting images, performing complex tasks, etc. In some implementations, the processor 202 may be coupled to the memory 204 via the bus 206 to access data and instructions therefrom and store data therein. The bus 206 may couple the processor 202 to the other components of the computing device 200 including, for example, the memory 204 and communication unit 208.

The memory 204 may store and provide access to data to the other components of the computing device 200. In some implementations, the memory 204 may store instructions and/or data that may be executed by the processor 202. For example, in the illustrated embodiment, the memory 204 may store the positional quick insert engine 226a/b. For example, in some implementations, the computing device 200 may represent a client device 106 and the memory 204 stores an instance of the positional quick insert engine 226a. As another example, in some implementations, the computing device 200 may represent a server 122 and the memory 204 stores an instance of the positional quick insert engine 226b. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random-access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 204 may be a single device or may include multiple types of devices and configurations.

The bus 206 can include a communication bus for transferring data between components of the computing device 200 and/or between computing devices (e.g., between the client device 106 and server 122), a network bus system including the network 102 or portions thereof, a processor mesh, a combination thereof, etc. In some implementations, the positional quick insert engine 226, its sub-components and various other software operating on the computing device 200 (e.g., an operating system, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, the communication or a portion thereof may be secure (e.g., via SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network 102, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols.

As mentioned above, the computing device 200 may include other and/or fewer components. Examples of other components may include a display, an input device, a sensor, etc. (not shown). In one embodiment, the computing device 200 includes a display 218. The display 218 may display electronic images and data for presentation to a user 112. The display 218 may include any conventional display device, monitor or screen, including, for example, an organic light-emitting diode (OLED) display, a liquid crystal display (LCD), etc. In some implementations, the display 218 may be a touch-screen display capable of receiving input from a stylus, one or more fingers of a user 112, etc. For example, the display may be a capacitive touch-screen display capable of detecting and interpreting multiple points of contact with the display surface.

The input device (not shown) may include any device for inputting information into the computing device 200. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user 112. For example, the user may interact with an emulated (i.e., virtual or soft) keyboard displayed on the touch-screen display by using fingers to contacting the display in the keyboard regions.
Example Positional Quick Insert Engine 226

Figure 3:
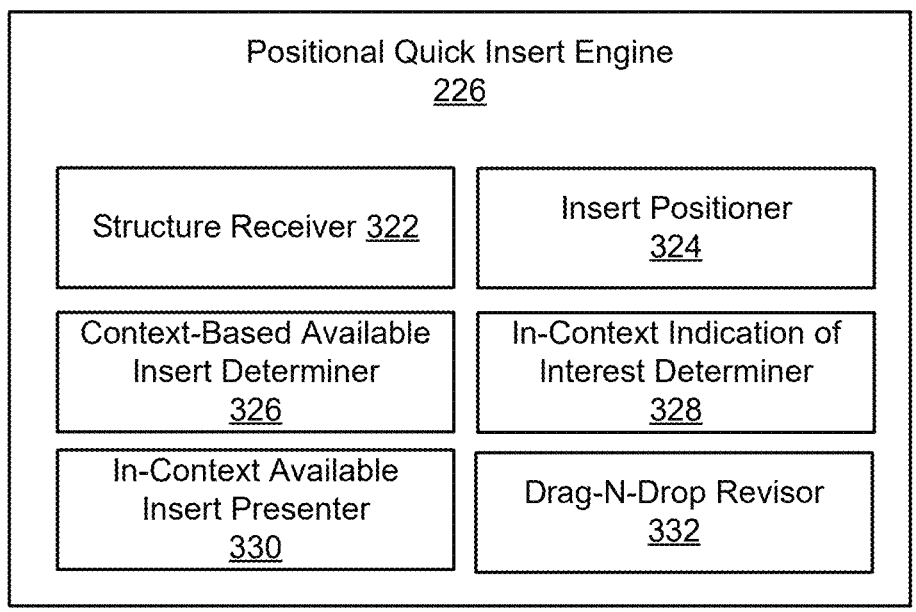
FIG. 3 is a block diagram of an example positional quick insert engine according to some implementations.

Referring now to FIG. 3, the positional quick insert engine 226 is shown in more detail according to one implementation. FIG. 3 is a block diagram of the positional quick insert engine 226 included, e.g., in a client device 106, according to one implementation.

Figure 4:
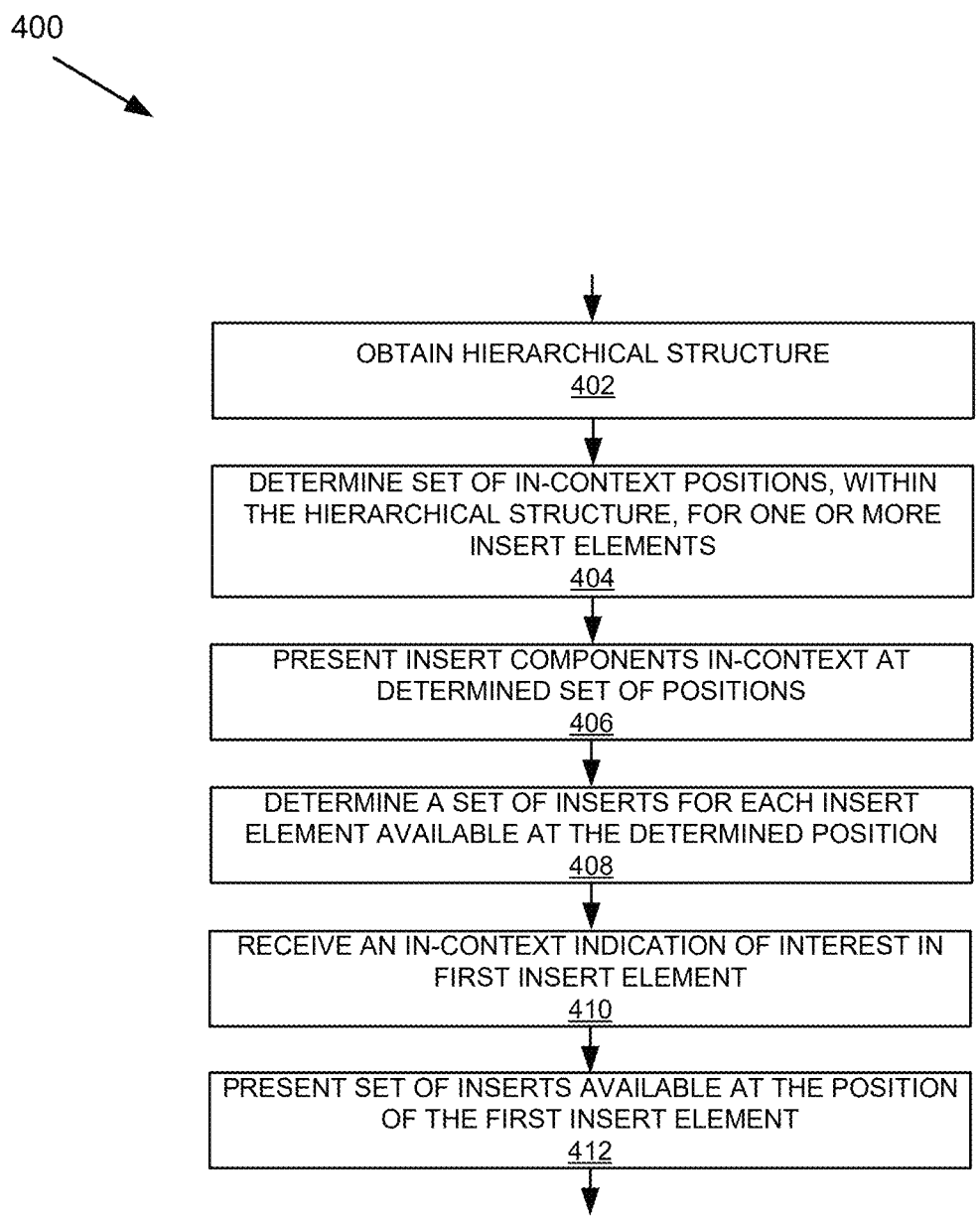
FIG. 4 is a flowchart of an example positional quick insert method according to some implementations.
Figure 6A:
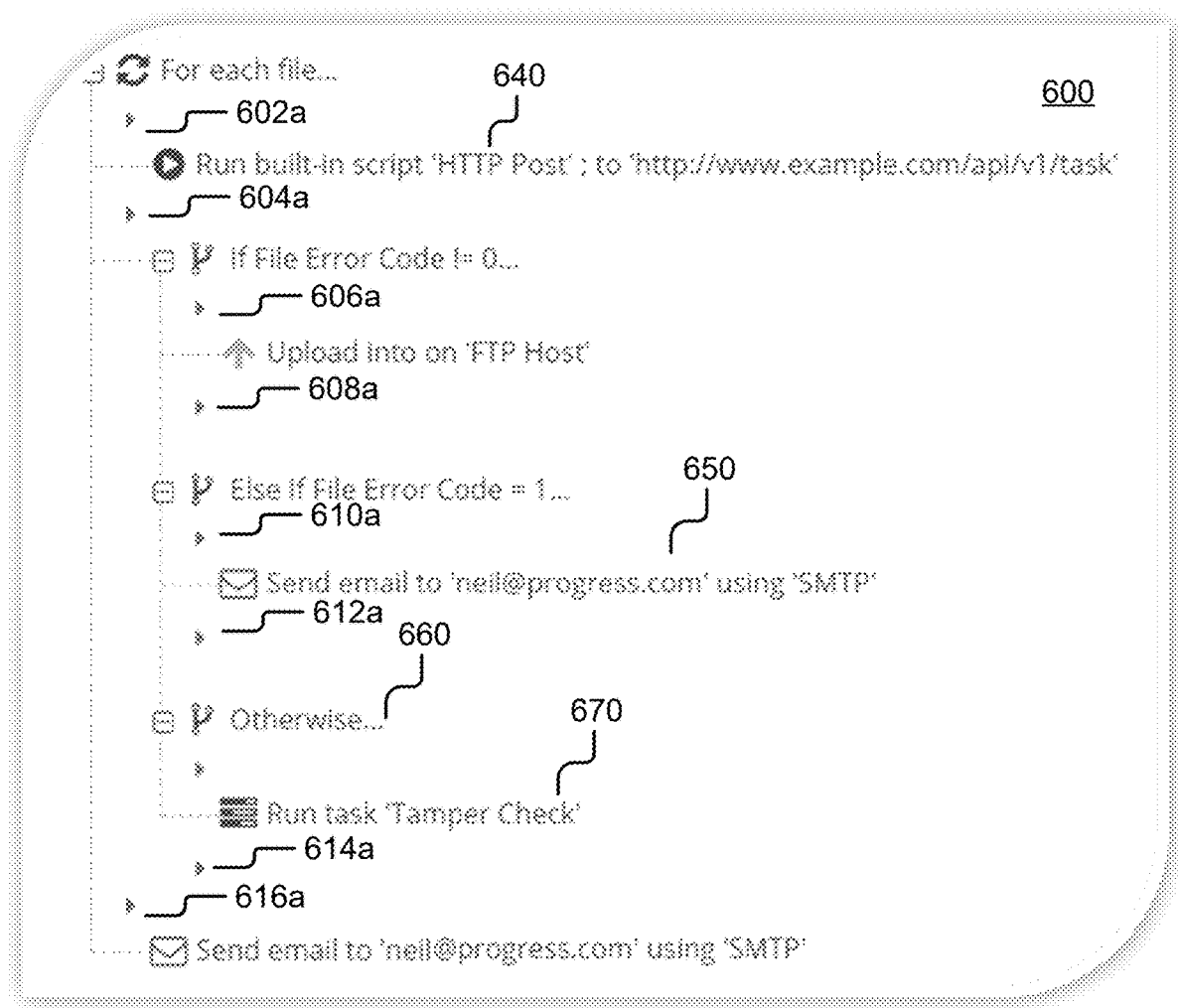
FIGS. 6A-C are example user interfaces for positional quick inserts according to some implementations.
Figure 6B:
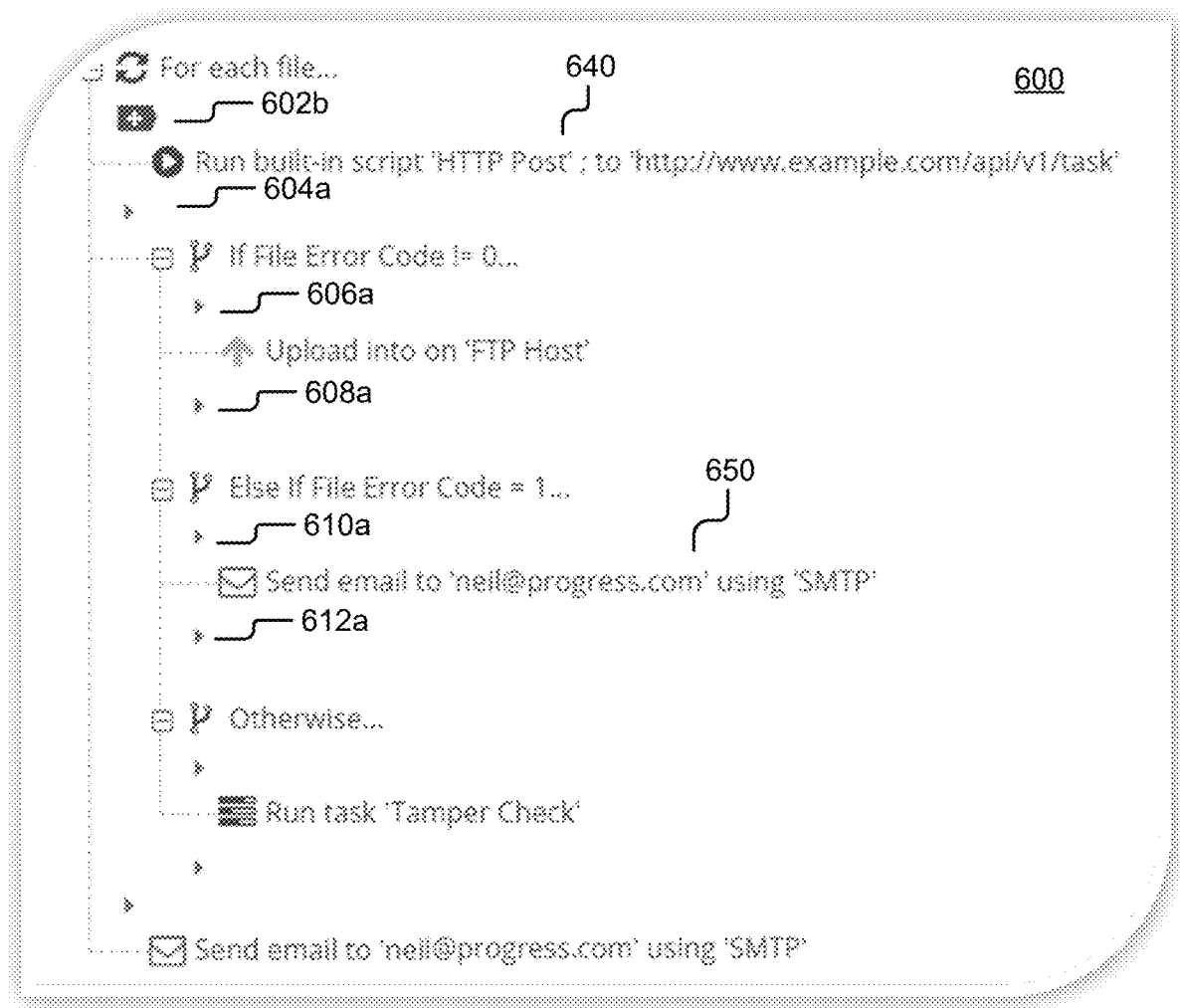
Figure 6C:
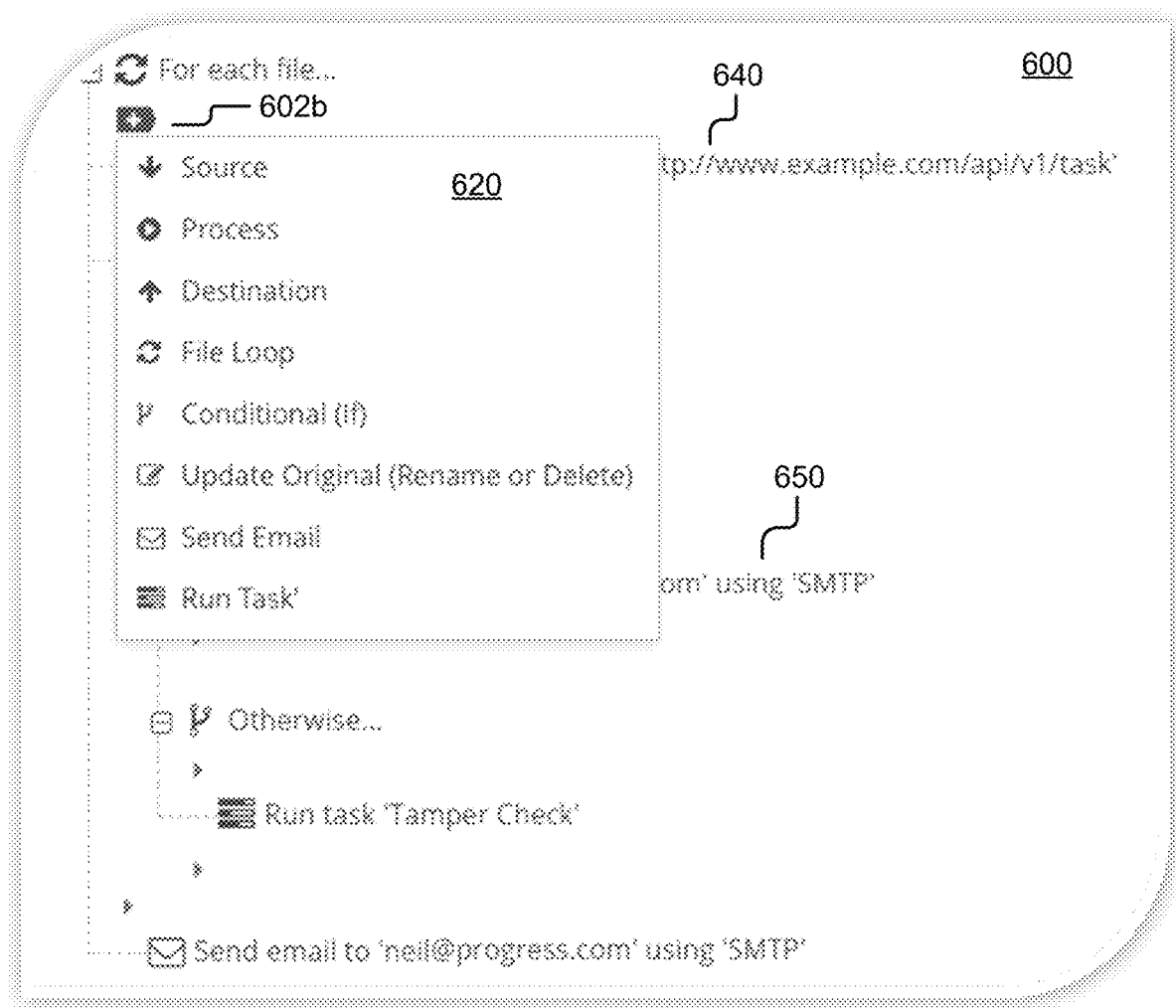

In the illustrated implementation, the positional quick insert engine 226 includes a structure receiver 322, an insert positioner 324, a context-based available insert determiner 326, an in-context indication of interest determiner 328, an in-context available insert presenter 330, and a drag-and-drop revisor 332, which are communicatively coupled and executed to provide the features and functionality described herein, for example, to perform the method 400 of FIG. 4, and to generate the user interfaces of FIGS. 6A-6C.

The structure receiver 322 receives a hierarchical structure. In some implementations, the received hierarchical structure includes a plurality of components and at least two levels of hierarchy. For clarity and convenience, the description herein makes reference to a tree as an example of a hierarchical structure, but depending on the implementation, but the disclosure is not limited only to a tree and, in some implementations or use cases, another hierarchical structure may be used. Depending on the use case or implementation, the hierarchical structure, occasionally referred to herein as simply as the "structure," may be received via import (e.g., from a saved file) or received by way of, at least partial, definition or building of the structure via the positional quick insert engine 226.

In some implementations, the positional quick insert engine 226 is associated with a low-code script builder (not shown), that allows a user to quickly generate and/or modify a script. In some implementations, the hierarchical structure of the script is representable as a tree and the structure receiver 322 obtains that structure and represents the structure of the script and its constituent components as a tree. An example of a tree representation of a script is described below with reference to FIGS. 6A-6C.

In some implementations, the structure receiver 322 sends the hierarchical structure to one or more other components of the positional quick insert engine 226, e.g., the insert positioner 324. In some implementations, the structure receiver 322 stores or otherwise makes the received hierarchical structure available to one or more other components of the positional quick insert engine 226, e.g., the insert positioner 324.

In some implementations, the insert positioner 324 determines where in the received structure an insert is available. For example, the insert positioner 324 determines a set of one or more positions within the hierarchical structure of a script where a user may insert a new script component. It should be noted that some hierarchical structures may have positions where insertions are available and/or positions where insertions are unavailable. For example, an insertion after the end of a script or before the beginning of the script may be unavailable. The preceding are merely examples of where an insert may be determined, by the insert positioner 324, to be unavailable and other examples exist and are within the scope of this disclosure. As another example, certain script components may be associated with insertions. For example, a script component "For each file . . ." may be associated with one or more operations to be performed for each file and, in some implementations, the insert positioner 324 determines an insert position is available subsequent to (e.g., immediately after or below) the "For each file . . ." component.

In some implementations, the insert positioner 324 analyzes the components and their hierarchical structure and determines at which location(s), or position(s), within the hierarchical structure an insert may be made. The logic applied by the insert positioner 324 to determine where, or whether, an insert is available may vary based on the implementation. In some implementations, the insert positioner 324 may apply a set of rules, a machine learning model, or a combination thereof.

In some implementations, the insert positioner 324 determines the position of an available insert, for visual presentation to a user, in two respects-relative at least one component in the hierarchical structure and relative to hierarchical level. For example, referring to FIG. 6A, the insert positioner 324 determines that insert positions are available before component 640, as represented by graphical insertion element 602a, and after, as represented by 604a, i.e., the position relative to component 640. As another example, still referring to FIG. 6A, the insert positioner 324 determines that the insert available after component 640, as represented by graphical insertion element 604a, is available at the same hierarchical level as component 640 and not a level beneath, which the insert positioner 324 represents by indenting graphical insert element 604a by the same amount as script component 640 in user interface 600.

In some implementations, the insert positioner 324 may use a set of rules to, at least partially, determine whether an insert is available and where (e.g., before, after, at the same hierarchical level, or at a different hierarchical level) an insert is available. In some implementations, the insert positioner 324 may receive (e.g., from a developer) at least a portion of a set of rules. For example, the insert positioner 324 receives a rule definition from a developer interaction, or a rule set previously defined by a developer, to add an insert position immediately following and nested below a "For each file . . ." component within a received structure.

As another example, in some implementations, a developer may define whether an insert is available before an "if" conditional component, after an "if" conditional component, or both, where the "if" conditional component is a component within the hierarchical structure of the script. Unless a contrary meaning is apparent from the context, a "developer" is a user 112 that is associated with the development of the positional quick insert engine 226 and/or, in the low-code script generation example, the developer of the low-code script generation environment using the positional quick insert engine 226, who defines the set of rules, and a "user" refers to a user 112 that is interacting with the hierarchical structure (e.g., by generating and modifying the tree structure of a script by inserting one or more additional components therein).

In some implementations, the insert positioner 324 may apply a machine learning model to determine one or more available insert positions. For example, the insert positioner 324 receives a set of hierarchical structures (e.g., previously generated scripts) as training data, trains and validates a machine learning model, then applies the resulting machine learning model to a hierarchical structure (e.g., a script) received by the structure receiver 322.

The varieties of supervised, semi-supervised, and unsupervised machine learning algorithms that may be used, by the insert positioner 324, to train a machine learning model are so numerous as to defy a complete list. Example algorithms include, but are not limited to, a decision tree; a gradient boosted tree; boosted stumps; a random forest; a support vector machine; a neural network; a recurrent neural network; long short-term memory; transformer; logistic regression (with regularization), linear regression (with regularization); stacking; a Markov model; Markov chain; support vector machines; and others. Additionally, the machine learning model, in some implementations, may be based on an ensemble of multiple machine learning algorithms, which may or may not be based on a common algorithm (e.g., gradient boosted tree) or a common type of machine learning algorithm (e.g., supervised).

In some implementations, the insert positioner 324 generates and presents a graphical element at each position, where an insert is determined to be available, within the hierarchical structure simultaneously/contemporaneously with the hierarchical structure (i.e., in-context). For example, the insert positioner 324 generates an arrow graphical element, or another icon, to indicate the locations within the structure where an insert is available. These insert elements are sometimes referred to herein as "graphical insert elements," "in-context positional insert elements" or similar. It should be noted that presenting the insert elements in the context of the structure and in the positions(s) within the structure may beneficially allow a user to quickly and easily locate the desired position for an insertion.

In some implementations, the insert positioner 324 generates a graphical insert element where the position in a first dimension (e.g., along the vertical/y axis) indicates a relative position of inserted component inserted in association with that insert element relative to other components sequentially (e.g., whether that inserted component should be executed before, or after, another peer-level component/node in the tree), and a second dimension (e.g., along the horizontal/x axis) is indicates a relative hierarchy level (e.g., indented to show that the component is nested/subordinate/below a preceding component that is less indented).

In some implementations, the insert positioner 324 sends the set of insert elements for presentation to the user. For example, the insert positioner 324 sends the set of insert elements, which are rendered in a user interface on a display of the user's client device 106. An example of a user interface is described below with reference user interface 600 and FIG. 6A.

In some implementations, the insert positioner 324 sends the set of available insert positions to one or more other components of the positional quick insert engine 226, e.g., the context-based available insert determiner 326. In some implementations, the insert positioner 324 stores or otherwise makes the set of available insert positions available to one or more other components of the positional quick insert engine 226, e.g., context-based available insert determiner 326.

In some implementations, the context-based available insert determiner 326 determines what set of inserts is available at a given position (e.g., a position determined to be available by the insert positioner 324) within the hierarchical structure. In some implementations, the set of inserts available (i.e., the set of inserts are that available at that particular position) may vary from position-to-position based on the context, e.g., where, or under what element, in the structure the associated position is located.

In some implementations, a developer may explicitly define a set of components available for insertion in association with a component within a hierarchical structure. For example, a developer may define a set of available script components available under a "For each file . . . " component. In some implementations, a developer may define a set of insert option rules for determining a set of components available for insertion. For example, a developer May define at least a partial set of in-context inserts and/or a set of context sensitive inserts that are available, or unavailable, for presentation to and use by a user generating the low-code script (or other hierarchical structure). In some implementations, the set of insert options may be at least partially generated by training and validating a machine learning algorithm, to generate one or more sets of insert options available at a given element/position generally and/or based on the element's context within the hierarchical structure. For example, in some implementations, the context-based available insert determiner 326 may use previously generated scripts to train and validate a machine learning algorithm that may be applied to a script being generated to determine the set of available inserts at a particular position.

The varieties of supervised, semi-supervised, and unsupervised machine learning algorithms that may be used, by the context-based available insert determiner 326, to train a machine learning model are so numerous as to defy a complete list. Example algorithms include, but are not limited to, a decision tree; a gradient boosted tree; boosted stumps; a random forest; a support vector machine; a neural network; a recurrent neural network; long short-term memory; transformer; logistic regression (with regularization), linear regression (with regularization); stacking; a Markov model; Markov chain; support vector machines; and others. Additionally, the machine learning model, in some implementations, may be based on an ensemble of multiple machine learning algorithms, which may or may not be based on a common algorithm (e.g., gradient boosted tree) or a common type of machine learning algorithm (e.g., supervised).

While the determination of available insert positions and available insertion are described with reference to distinct components, i.e., 324 and 326, the determinations may not be entirely distinct. For example, in some implementations, a machine learning model may be trained, validated, and applied to both determine, at least in part, the set of available insert positions and determine, at least in part, the set of insertions available at each position in the hierarchical structure.

Depending on the implementation or use case, the set of available inserts for a particular position within the hierarchical structure may be pre-determined by the context-based available insert determiner 326 or determined ad hoc (e.g., responsive to an indication of interest in an insertion at that particular position of interest).

In some implementations, the in-context indication of interest determiner 328 determines which in-context positional insert element, or associated insert position, a user is interested in. Depending on the implementation and use case, the indication of interest may vary. Examples include, but are not limited to hovering a mouse over the graphical element displayed at the insert position, selecting (e.g., via keyboard, mouse click, voice command, etc.), etc.

In some implementations, the insert element, determined to be of interest, may be visually altered to show the user which position has been determined to be of interest. For example, referring to FIGS. 6A and 6B, the insert element 602a may change to insert element 602b. This distinction may beneficially disambiguate which insertion position is selected, e.g., where serial or proximal inserts are available at different levels of the hierarchical structure of the tree.

In some implementations, the in-context available insert presenter 330 presents, or causes presentation of, an in-context menu of one or more inserts available proximate to the determined position of interest. For example, in some implementations, the in-context available insert presenter 330 presents the menus to be contemporaneously displayed with and proximate to an insert element determined to be of interest and the script, so that the user has visual context of where the insertion is occurring. An examples of an in-context menu is illustrated as 620 in FIG. 6C, which is described below.

In some implementations, the user may select from the set of available inserts a component for insertion into the hierarchical structure at the associated position. In some implementations, the selection of a "new" component for insertion generates a request to modify the hierarchical structure and the hierarchical structure is modified in response to the request, thereby completing the insertion. In some implementations, the positional quick insert engine 226 may (re) execute and receive the updated/modified hierarchical structure, so that the modified hierarchical structure and any additional/new insert positions may be represented to the user.

It should be recognized that the systems, methods, and user interfaces described herein may increase one or more of: the speed of an insert, the accuracy of an insert, the intuitiveness of an interface, a user friendliness of an interface, and accessibility of an interface. However, a user may wish to move a previously inserted component within the hierarchy.

The drag-n-drop revisor 332 allows a user to revise the tree using drag-and-drop functionality. In some implementations, the portion of the tree being dragged and dropped may vary in granularity from a single insertion, or inserted action, to a large branch with multiple sub-branches/sub-components. In some implementations, the drag-n-drop revisor 332, responsive to input dragging a branch (i.e., a component with subordinate components), collapses the branch (e.g., visually in the user interface while the branch is being dragged to a new location). In some implementations, the drag-n-drop revisor 332 inserts the branch when "dropped" in the new location and revises the tree structure.

For example, the drag-n-drop revisor 332 generates a request to modify the hierarchical structure based on the drag-and-drop and the positional quick insert engine 226 (re) executes, e.g., receives and displays the modified hierarchical structure with revised insert elements.

Example Method

FIG. 4 describes an example method performable by the systems described in FIGS. 1-3 including the positional quick insert engine 226 according to some implementations. At block 402, the structure receiver 322 obtains a hierarchical structure. At 404, the insert positioner 324 determines a set of in-context positions, within the hierarchical structure for association with one or more graphical elements. At block 406, the insert positioner 324 presents one or more insert elements in-context of the presented hierarchical structure at the determined set of positions, where the one or more insert elements includes a first insert element. At block 408, the context-based available insert determiner 326 determines a set of inserts for association with each insert element available at the determined position. At block 410, the in-context indication of interest determiner 328 receives an in-context indication of interest in a first insert element within the presentation of the hierarchical structure. At block 412, the in-context available insert presenter 330 presents a set of inserts available at the position of the first insert element. It should be recognized that the preceding is merely one example method and others are within the scope of this presentation. Additionally, it should be recognized that the order of blocks is for illustrative purposes and alternative orders are contemplated and within the scope of the present disclosure. For example, in some implementations, the relative order, or position, of blocks 406 and 408 in method 400 may be reversed.

Example User Interfaces

Figure 5:
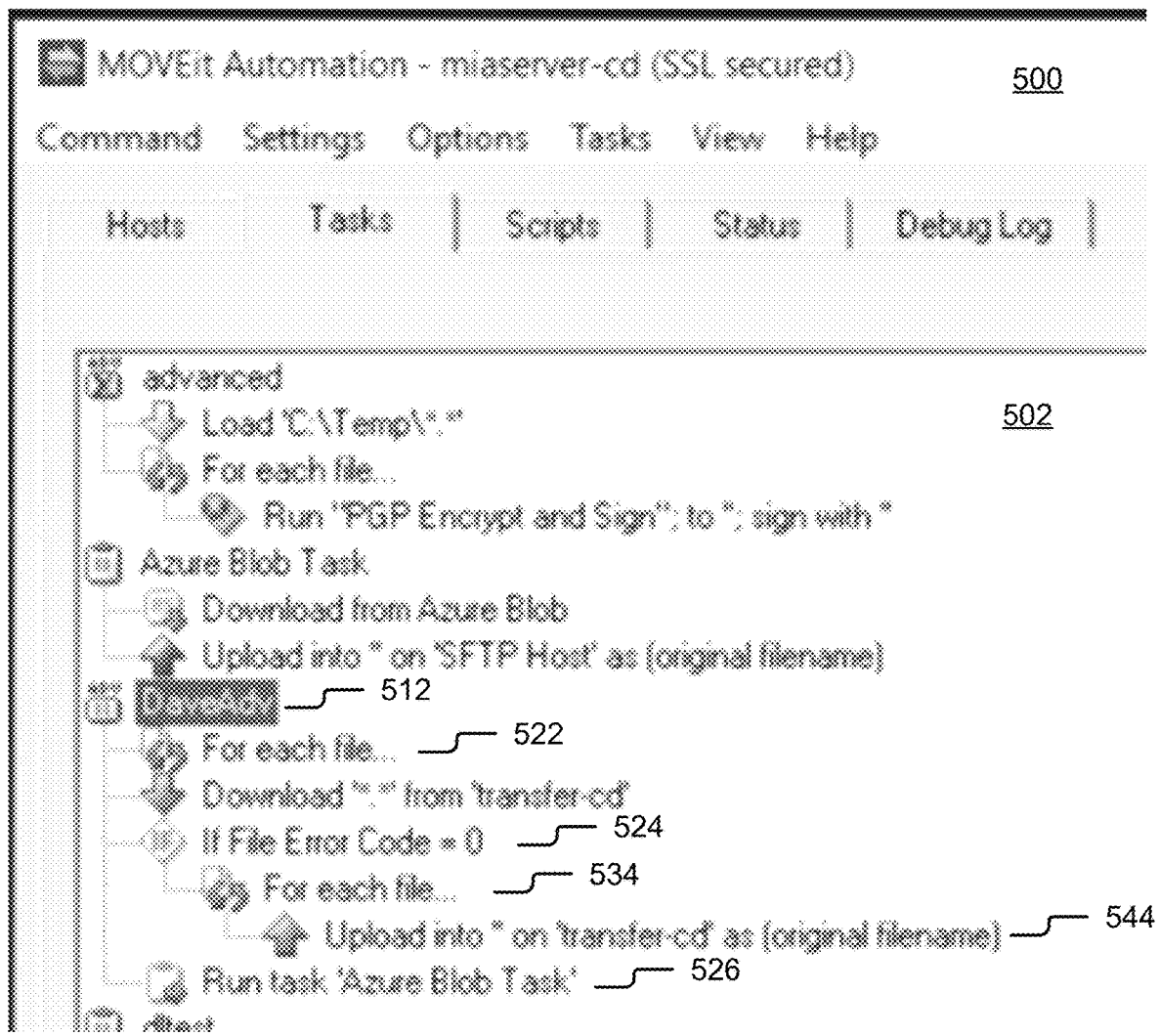
FIG. 5 is an example user interface illustrating a tree structure.

The example interfaces of FIGS. 5-7C are provided for clarity and convenience to better illustrate certain features and functionalities of some implementations of the positional quick insert engine 226. For example, FIGS. 6A-7C are example user interfaces generated by the positional quick insert engine 226 according to some implementations. For contrast, comparison is made to an example of a user interface associated with an existing approach, which is illustrated by FIG. 5. However, it should be recognized that FIGS. 6A-7C are merely examples, and variations exist and within the scope of this disclosure.

FIG. 5 illustrates an example user interface 500 presenting a tree hierarchical structure of a script in section 502. The hierarchical structure includes multiple script components at various levels of hierarchy. For example, the "DaveAdv" component 512 has subordinate components "For each file . . ." 522 and "If File Error Code=0" 524 displayed as one level below the "DaveAdv" component 512 in the hierarchical tree structure of the illustrated script. As illustrated in section 502, components 522 and 524 are below component 512, that relative position along with the connecting lines and that components 522 and 524 are inset or indented, by one increment, compared to component 512 visually indicated that they are one level below, or subordinate to, component 512.

As illustrated in FIG. 5, there is no visual indication of where an insert may occur in the tree structure presented in section 502, where a requested insertion would be position or what options are available for insertion. In some existing solutions, the insert option is buried in a menu, which takes the user out of the context of the script. For example, the user interface 500 may no longer display section 502 altogether to display that menu, which increases the risk of error or time, as the user may need to navigate back to view section 502 and reminder himself/herself of the relative position, or context within the script. That is if a positional insertion is even supported, as some solutions have a fixed insertion point (e.g., at the end of the script), which requires that the insertion be made initially at that point and subsequently moved to the desired position. In some existing solutions, the insert option is accessible through a right-click, which is not compatible with, e.g., Mac users, and may require a user to transition to a pointing device from a keyboard, which may slow development of the script.

In some existing solutions, when some level of positional insertion is supported, it is ambiguous where the insert is going to occur. For example, assume the user right-clicks on "If File Error Code=0" component 524, it is unclear where the insertion would occur. Such an insertion may occur immediately above component 524 and at the same hierarchical level as components 522 and 524. Alternatively, the insertion may occur immediately below component 524. Above the "For each file . . . " component 534 nested, or subordinate to, component 524 and at that same level (e.g., visual indentation) within the hierarchical structure of the script's tree. Alternatively, the insertion may occur immediately above component 526 and have the same level (e.g., visual indentation) within the hierarchical structure components 524 and 526. Such ambiguity may result in errors and inefficiencies.

FIG. 6A illustrates an example of a user interface 600 generated in accordance with some implementations of the positional quick insert engine 226 described herein. In FIG. 6A, the hierarchical tree structure of a script being generated by a user is illustrated in accordance with some implementations. In FIG. 6A, multiple instances of blue arrows 602a-616a, which are an example of a graphical insertion element. The graphical elements associated with insertion, which may also be referred to herein as graphical insertion elements or similar, as illustrated in FIG. 6A beneficially indicate positions within the tree structure of the script where an insert is available/is permitted to occur.

In some implementations, the graphical insertion elements 602a-616a of FIG. 6A are positional in two respects. In a first respect, the elements 602a-616a are positioned, when presented in the user interface 600, relative to script components and/or the sequence of the script components. For example, in some implementations, selection and use of graphical insertion element 602a inserts a (new) script component (not shown) before script component 640, while selection and use of graphical insertion element 604a inserts a script component (not shown) after script component 640. In a second respect, the elements 602a-612a are positioned, when presented in the user interface 600, relative to hierarchical level. For example, in FIG. 6A, the graphical insertion elements 602a and 604a are visually presented as indented the same (i.e., same relative horizontal starting position) as script component 640, and graphical insertion elements 610a and 612a are visually presented as indented the same as script component 650. In some implementations, the position of the graphical insert element (e.g., horizontally) disambiguates the hierarchical level of any component inserted in association with that graphical insert element. For example, insertions made using either graphical insert element 602a or 604a have the same hierarchical level as existing script component 640, as visually represented by their shared indentation (horizontal position) in the presented tree structure of the script. It should be recognized that graphical elements 614a and 616a are displayed as distinct insertion points and are associated with different hierarchical levels, as represented by their relative indentation. The multiple insert elements, 614a and 616a, and their use to insert a component disambiguates whether a component being inserted after the "Otherwise . . . " component 660 is supposed to subordinate to component 660, with the same level as the "Run Task 'Tamper Check'" component 660, or whether the inserted component is to be at a peer level with the "Run built in script . . . " component 640.

In some implementation, when the user 112 hovers a mouse over graphical insertion element instance 602a, uses a keyboard to navigate the script to instance 602a, or otherwise indicates interest in an insertion at the position associated with graphical insertion element 602a, the graphical element 602a visually changes. Referring now to FIG. 6B, the graphical insertion element 602a has changed to the tag with a plus sign as indicated at 602b. In the illustrated implementation, the relative position of the 602b (i.e., vertically indicative of relative position to a sequence of script and horizontally as indicative of relative position in hierarchy) is unchanged from 602a. It should be recognized that the graphical insertion element 602b, as illustrated in FIG. 6B, is merely provided as one example of a second graphical element and other variations (e.g., other colors, shapes, icons, sizes, etc.) exist and are within the scope of this disclosure.

In some implementations, when graphical element 602b may be selected, hovered over for an even longer period, or other indication of interest is received, a set of available inserts may be presented. Referring now to FIG. 6C, a menu 620 of insertions available based on the position associated with graphical insertion element 602b and context within the script and its hierarchical structure is displayed. As illustrated in FIG. 6C, there are multiple available insertion options—"Source," "Process," "Destination," "File Loop," "Conditional (If)," "Update Original (Rename or Delete)," "Send Email," and "Run Task." Accordingly, the user may select to insert a source, a process, a destination, a file loop, a condition, an update original, send an email, or run task at the position associated with graphical insertion element 602b.

The presence and/or selection of the graphical insertion elements 602a and 602b, disambiguates the position where in the script and at what level within the associated hierarchy the insertion is going to occur. Moreover, the presentation of the insert menu 620 contemporaneously in the context of, or with, the hierarchical script keeps the user in-context of where in the structure the insertion is being performed. Additionally, the presence of a graphical insert element may enable broader usability. For example, the graphical element may be compatible with accessibility tools (e.g., a screen reader or text-to-speech) to allow a visually impaired user to more easily navigate the hierarchical structure and insert a desired step, process, or other script component. As another example, access to the insert menu 620 is independent of, or agnostic to, the computing device 200 according to some implementations. For example, a user need not have a Windows device and mouse to right-click to access the menu 620 according to some implementations. As another example, the user interfaces of FIGS. 6A-6C may be navigated using only a keyboard in some implementations. Such navigation may not be available in alternative solutions and may be more expedient, as it eliminates transitions between keyboard and pointer.

The options of menu 620 of FIG. 6C are examples for illustrative purposes and other (e.g., more, less, or different options) may be present depending on one or more of the implementation and the position of the insertion. For example, in some implementations, the menu 620 is context sensitive and presents a different set of available, and context/position-appropriate, insertions depending on the position of insertion and one or more proximate script components (e.g., based on a script component under which the insertion is nested or that immediately precedes and/or follows the insertion).

OTHER CONSIDERATIONS

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   obtaining, using one or more processors, a hierarchical structure associated with a script, the hierarchical structure including a plurality of components;
   determining, using the one or more processors, a set of available insertion positions within the hierarchical structure, the set of available positions including a first position, wherein an available insertion position is a position within the hierarchical structure that, responsive to a user request, a new component may be inserted into the hierarchical structure;
   determining, using the one or more processors, a set of inserts available at the first position within the hierarchical structure;
   presenting, using the one or more processors, to a user, a user interface, the user interface representing:
   the hierarchical structure of the plurality of components;
   a set of graphical insert elements, wherein each graphical insert element within the set of graphical insert elements is associated with one of the available insertion positions from the determined set of available insertion positions, the set of graphical insert elements including a first graphical insert element associated with the first position within the hierarchical structure;
   receiving, using the one or more processors, in association with the first graphical insert element, a request to insert the new component into the hierarchical structure at the first position associated with the first graphical insert element; and
   modifying, using the one or more processors, the hierarchical structure by inserting the new component into the hierarchical structure at the first position associated with the first graphical insert element.

2. The method of claim 1, wherein determining the set of available insert positions is based on one or more of a set of rules and machine learning.

3. The method of claim 1, the method further comprising:
   determining a first set of inserts available at the first position within the hierarchical structure based on context of the first position.

4. The method of claim 3, wherein determining the first set of inserts available at the first position within the hierarchical structure based on the context of the first position is based on one or more of a set of rules and machine learning.

5. The method of claim 3, the method further comprising:
   determining an indication of interest associated with the first graphical insert element; and
   presenting, to the user, the first set of inserts available at the first position within the hierarchical structure responsive to the indication of interest.

6. The method of claim 1, wherein the script is being generated in a low-code environment, and wherein the set of inserts available are associated with low-code components that may be inserted into the script at the first position.

7. The method of claim 5, wherein the first set of inserts available at the first position within the hierarchical structure is presented contemporaneously with the first graphical insert element and at least a portion of the hierarchical structure, and wherein presentation of the first graphical insert element is modified to indicate that the first graphical insert element has been determined to be of interest.

8. The method of claim 5, wherein the first graphical insert element is determined to be of interest responsive to one or more of a pointer hover over the first graphical insert element, a click on the first graphical insert element using a pointer, and navigation to the first graphical insert element using a keyboard.

9. The method of claim 1, wherein the user interface is a graphical user interface and the first position is represented visually to the user on a display in a first dimension associated with the first graphical insert element and a second dimension associated with the first graphical insert element, wherein the first dimension visually represents a sequential order of a component inserted at the first position relative to a peer level component in the hierarchical structure, and wherein the first dimension visually represents a level within the hierarchical structure of a component inserted at the first position.

10. The method of claim 1, wherein the hierarchical structure is a tree.

11. A system comprising:
    a processor; and
    a memory, the memory storing instructions that, when executed by the processor, cause the system to:
    obtain hierarchical structure associated with a script, the hierarchical structure including a plurality of components;
    determine a set of available insertion positions within the hierarchical structure, the set of available positions including a first position, wherein an available insertion position is a position within the hierarchical structure that, responsive to a user request, a new component may be inserted into the hierarchical structure;

determine a set of inserts available at the first position within the hierarchical structure;

present to a user, a user interface, the user interface representing:

the hierarchical structure of the plurality of components;

a set of graphical insert elements, wherein each insert graphical element within the set of graphical insert elements is associated with one of the available insertion positions from the determined set of available insertion elements, the set of graphical insert elements including a first graphical insert element associated with the first position within the hierarchical structure;

receive in association with the first graphical insert element, a request to insert the new component into the hierarchical structure at the first position associated with the first graphical insert element; and modify the hierarchical structure by inserting the new component into the hierarchical structure at the first position associated with the first graphical insert element.

12. The system of claim 11, wherein determining the set of available insert positions is based on one or more of a set of rules and machine learning.

13. The system of claim 11 further comprising instructions that, when executed, cause the system to:

determining a first set of inserts available at the first position within the hierarchical structure based on context of the first position.

14. The system of claim 13, wherein determining the first set of inserts available at the first position within the hierarchical structure based on the context of the first position is based on one or more of a set of rules and machine learning.

15. The system of claim 13 further comprising instructions that, when executed, cause the system to:

determining an indication of interest associated with the first graphical insert element; and presenting, to the user, the first set of inserts available at the first position within the hierarchical structure responsive to the indication of interest.

16. The system of claim 11, wherein the script is being generated in a low-code environment, and wherein the set of inserts available are associated with low-code components that may be inserted into the script at the first position.

17. The system of claim 15, wherein the first set of inserts available at the first position within the hierarchical structure is presented contemporaneously with the first graphical insert element and at least a portion of the hierarchical structure, and wherein presentation of the first graphical insert element is modified to indicate that the first graphical insert element has been determined to be of interest.

18. The system of claim 15, wherein the first graphical insert element is determined to be of interest responsive to one or more of a pointer hover over the first graphical insert element, a click on the first graphical insert element using a pointer, and navigation to the first graphical insert element using a keyboard.

19. The system of claim 11, wherein, wherein the user interface is a graphical user interface and the first position is represented visually to the user on a display in a first dimension associated with the first graphical insert element and a second dimension associated with the first graphical insert element, wherein the first dimension visually represents a sequential order of a component inserted at the first position relative to a peer level component in the hierarchical structure, and wherein the first dimension visually represents a level within the hierarchical structure of a component inserted at the first position.

20. The system of claim 11, wherein the hierarchical structure is a tree.

* * * * *